United States Patent
Zhu

(10) Patent No.: US 8,743,058 B2
(45) Date of Patent: Jun. 3, 2014

(54) MULTI-CONTACT CHARACTER INPUT METHOD AND SYSTEM

(75) Inventor: Lin Zhu, Shanghai (CN)

(73) Assignee: Intsig Information Co., Ltd., Shanghai (CN)

( * ) Notice: Subject to any disclaimer, the term of this patent is extended or adjusted under 35 U.S.C. 154(b) by 261 days.

(21) Appl. No.: 13/394,248

(22) PCT Filed: Aug. 20, 2010

(86) PCT No.: PCT/CN2010/076184
§ 371 (c)(1),
(2), (4) Date: Mar. 5, 2012

(87) PCT Pub. No.: WO2011/026395
PCT Pub. Date: Mar. 10, 2011

(65) Prior Publication Data
US 2012/0162083 A1    Jun. 28, 2012

(30) Foreign Application Priority Data
Sep. 7, 2009   (CN) .......................... 2009 1 0195252

(51) Int. Cl.
*G06F 3/02*    (2006.01)
(52) U.S. Cl.
USPC .......................................... 345/168; 345/173
(58) Field of Classification Search
CPC ....... G06F 3/02; G06F 3/0416; G06F 3/0488; G06F 3/04886
USPC .................................. 345/156, 168, 169, 173
See application file for complete search history.

(56) References Cited

U.S. PATENT DOCUMENTS

| | | | |
|---|---|---|---|
| 6,037,882 A * | 3/2000 | Levy .............................. | 341/20 |
| 6,107,997 A | 8/2000 | Ure | |
| 6,594,023 B1 * | 7/2003 | Omura et al. ................ | 356/620 |
| 7,113,174 B1 * | 9/2006 | Takekawa et al. ........... | 345/173 |
| 7,158,123 B2 * | 1/2007 | Myers et al. ................. | 345/173 |
| 8,508,485 B2 * | 8/2013 | Huh ............................. | 345/173 |

(Continued)

FOREIGN PATENT DOCUMENTS

| | | |
|---|---|---|
| CN | 1820242 A | 8/2006 |
| CN | 101414232 A | 4/2009 |
| CN | 101458591 A1 | 6/2009 |
| CN | 101655771 A | 2/2010 |

OTHER PUBLICATIONS

Dec. 2, 2010 International Search Report issued in International Patent Application No. PCT/CN2010/076184 (with translation).

*Primary Examiner* — Joe H Cheng
(74) *Attorney, Agent, or Firm* — Oliff PLC

(57) ABSTRACT

A multi-contact character input method includes: setting an input character corresponding to each multi-contact operation, in which attributes of the multi-contact operation include a position of each contact in a plurality of contacts, or/and the number of contacts contacting a multi-point touch screen within the same time, or/and a sliding direction of each contact; a user performing a multi-contact operation; identifying the multi-contact operation of the user and obtaining a corresponding input character according to the attributes of the multi-contact operation; and inputting the corresponding character. The multi-contact character input method fully uses the advantages of multi-point touch sensing, implements the input of frequently used functional keys or character keys through a multi-point touch combination of a special manner, and provides input convenience for the user without requiring the user to change a click input mode.

12 Claims, 12 Drawing Sheets

(56) References Cited

U.S. PATENT DOCUMENTS

| | | | |
|---|---|---|---|
| 8,581,851 B2* | 11/2013 | Pienimaa et al. | 345/171 |
| 8,612,856 B2* | 12/2013 | Hotelling et al. | 715/702 |
| 2005/0046621 A1 | 3/2005 | Kaikuranta | |
| 2005/0162402 A1* | 7/2005 | Watanachote | 345/173 |
| 2006/0026536 A1* | 2/2006 | Hotelling et al. | 715/863 |
| 2006/0044259 A1* | 3/2006 | Hotelling et al. | 345/156 |
| 2006/0161846 A1* | 7/2006 | Van Leeuwen | 715/702 |
| 2007/0257890 A1* | 11/2007 | Hotelling et al. | 345/173 |
| 2008/0036743 A1* | 2/2008 | Westerman et al. | 345/173 |
| 2008/0316183 A1 | 12/2008 | Westerman et al. | |
| 2011/0134068 A1* | 6/2011 | Shimoni | 345/173 |
| 2012/0293440 A1* | 11/2012 | Hotelling et al. | 345/173 |
| 2013/0147761 A1* | 6/2013 | Westerman et al. | 345/174 |

\* cited by examiner

MULTI-CONTACT CHARACTER INPUT METHOD AND SYSTEM

BACKGROUND OF THE PRESENT INVENTION

1. Field of Invention

In the field of input technologies of a handheld device, the present invention relates to a character input method, and more particularly to a multi-contact character input method; meanwhile, the present invention further relates to a multi-contact character input system.

2. Description of Related Arts

In recent years, various handheld devices including a cell phone are increasingly widely applied, and various necessary input manners of operating the electronic devices emerge accordingly, such as a common 9-key keyboard and a qwerty keyboard on the cell phone. Both the 9-key keyboard and the qwerty keyboard may be presented in the following two manners. One is a pressing hard keyboard, such as a qwerty keyboard on BlackBerry 8830 of RIM Company. The other one is a virtual soft keyboard on a touch screen, such as a qwerty keyboard on iPhone or other cell phones with touch screens. Some cell phones have both a hard keyboard and a virtual soft keyboard on a touch screen, such as P1i cell phone of Sony Ericsson. In addition to that the touch screen has a touch sensing function, the hard keyboard may also have the touch sensing function, for example, the A668 cell phone of Motorola adopts a touch sensing keyboard, thereby implementing a function through which a user can directly write in a keyboard area through fingers.

The functions of both the touch screen and the touch sensing keyboard can be classified into the following two kinds. One is conventional single-point touch sensing, that is, states such as contacting, moving and leaving of only one touch point can be sensed in the touch sensing area. The other one is multi-point touch sensing represented by iPhone, that is, states such as contacting, moving and leaving of one or more touch points can be sensed in the touch sensing area.

The touch sensing keyboard, the 9-key keyboard or the qwerty keyboard, on the handheld electronic device has a common defect, that is, the keys are too small and it is inconvenient to click. For example, each key on the virtual qwerty keyboard on the touch screen is small due to the limitation of the touch screen space, and if the user presses the keys through fingers not through a special stylus pen during inputting, the user should be very careful to avoid mistakes.

United State patent application 20080316183 of Apple Company: Swipe Gestures for Touch Screen Keyboard discloses a method for implementing frequently used functional keys through swipes. The method implements the frequently used functional keys or character keys such as shift (that is, an uppercase/lowercase switch during input of English characters), space, backspace (that is, deleting a previously input character), and line feed through swipes in four directions of up, down, left, and right on the virtual keyboard displayed on the touch screen. A defect of the method lies in that, when the user makes swipes in four directions of up, down, left, and right during the process of clicking the keyboard for inputting the characters, a process of mode switch is implied, that is, it is required to first switch from a click input mode to a swipe input mode and then switch back to the click input mode after the swipes, which brings inconvenience to the user.

SUMMARY OF THE PRESENT INVENTION

The technical problem to be solved by the present invention is to provide a multi-contact character input method, which may provide input convenience for a user without requiring the user to change a click input mode.

In addition, the present invention further provides a multi-contact character input system, which may provide input convenience for the user without requiring the user to change the click input mode.

In order to solve the foregoing technical problems, the present invention adopts the following technical solutions.

A multi-contact character input method comprises the following steps:

A1. setting an input character corresponding to each multi-contact operation, and recording the character or/and an operation command corresponding to each operation into a database, wherein attributes of the multi-contact operation comprise a position of each contact in a plurality of contacts, or/and the number of contacts of fingers contacting a multi-point touch screen within the same time, or/and a sliding direction of each finger;

B1. a user performing a multi-contact operation;

C1. identifying the multi-contact operation of the user, and searching for a corresponding input character in the database according to the attributes of the multi-contact operation; and D1. inputting the corresponding character.

A multi-contact character input method comprises the following steps:

A. setting an input character corresponding to each multi-contact operation, wherein attributes of the multi-contact operation comprise a position of each contact in a plurality of contacts, or/and the number of contacts contacting a multi-point touch screen within the same time, or/and a sliding direction of each contact;

B. a user performing a multi-contact operation;

C. identifying the multi-contact operation of the user, and obtaining a corresponding input character according to the attributes of the multi-contact operation; and D. inputting the corresponding character.

As a preferred solution of the present invention, in Step A, the multi-contact operation is set to involve two contacts: a first contact and a second contact, wherein a position of the first contact is any position on a multi-contact screen or any position, except each key, on a virtual keyboard; and the second contact is a key on the virtual keyboard. According to the setting, pressing the first contact is equivalent to pressing "Shift" or "Ctrl" on the virtual keyboard.

As a preferred solution of the present invention, in Step A, the multi-contact operation is set to involve at least two contacts, and a position of each contact is any position on the multi-contact screen or any position, except each key, on the virtual keyboard. When each contact is clicked at the same time, the input character is a set character.

As a preferred solution of the present invention, in Step A, the multi-point touch screen is divided into several areas, or the area, except each key, on the virtual keyboard is divided into several areas. A position of each contact in the plurality of contacts is distributed in each area. During a multi-contact operation, one area may not have any contact, or have one contact, or have multiple contacts at the same time.

As a preferred solution of the present invention, the multi-point touch screen is divided into a left area and a right area, and it is set that: if the left area of the virtual keyboard on the touch screen is clicked through two or more fingers at the same time, a set character is designated to be input, and if the right area of the virtual keyboard on the touch screen is clicked through two or more fingers at the same time, a set character is designated to be input; or the left area and the right area are clicked through a set number of fingers respectively to input a set character; or the multi-point touch screen is divided into an upper area and a lower area, and it is set that: if the upper area of the virtual keyboard on the touch screen is clicked through two or more fingers at the same time, a set character is designated to be input, and if the lower area of the virtual keyboard on the touch screen is clicked through two or more fingers at the same time, a set character is designated to be input; or the upper area and the lower area are clicked through a set number of fingers respectively to input a set characters.

As a preferred solution of the present invention, when the user designates a specific character, the user clicks the virtual keyboard on the touch screen through at least two fingers, and a position clicked through each finger is recorded as a standard input position of the specific character. After the user pre-designates the specific character, when actually the user clicks the virtual keyboard on the touch screen through fingers at the same time for an input operation, a control program of the virtual keyboard calculates, through a processor of the device, distance parameters between positions clicked by the user through two fingers at this time and the recorded standard input positions of the specific character pre-designated by the user, and a specific character closest to a set value is selected as a character to be input by the user.

A multi-contact character input system comprises:

a multi-contact operation setting module, used for setting an input character corresponding to each multi-contact operation, wherein attributes of the multi-contact operation comprise a position of each contact in a plurality of contacts, or/and the number of contacts contacting a multi-point touch screen within the same time, or/and a sliding direction of each contact;

a database, used for recording a character or/and an operation command corresponding to each multi-contact operation;

an operation identifying module, used for identifying the multi-contact operation of a user; and an operation parsing module, used for obtaining a corresponding input character from the database according to the attributes of the multi-contact operation.

The beneficial effects of the present invention lie in that, the multi-contact character input method according to the present invention fully utilizes the advantages of the multi-point touch sensing, and implements input of frequently used functional keys or character keys through a multi-point touch combination of a special manner, which provides input convenience for the user without requiring the user to change a click input mode.

BRIEF DESCRIPTION OF THE DRAWINGS

FIG. 2 illustrates an example of a method for implementing the "shift" functional key by pressing a certain position at the left of a virtual keyboard.

FIG. 3 illustrates an example of a method for implementing the "shift" functional key by pressing a certain position at the right of a virtual keyboard.

DETAILED DESCRIPTION OF THE PREFERRED EMBODIMENTS

The preferred embodiments of the present invention are described in detail in the following with reference to the accompanying drawings.

Embodiment 1

The present invention provides a convenient input method capable of being applied to a multi-point touch screen or a multi-point touch sensing keyboard. The method uses a specific multi-point touch combination to implement input of frequently used functional keys or character keys, and provides input convenience for a user without requiring the user to change a click input mode.

A multi-contact character input method according to the present invention includes the following steps:

A. setting an input character or/and an operation command corresponding to each multi-contact operation, in which attributes of the multi-contact operation include a position of each contact in a plurality of contacts, or/and the number of contacts contacting a multi-point touch screen within the same time, or/and a sliding direction of each contact;

B. a user performing a multi-contact operation;

C. identifying the multi-contact operation of the user, and obtaining a corresponding input character or operation command according to the attributes of the multi-contact operation; and D. inputting the corresponding character or operation command.

(1) The method may conveniently implement input of uppercase letters.

In Step A, it is set that the multi-contact operation involves two contacts: a first contact and a second contact, in which a position of the first contact is any position on a multi-contact screen or any position, except each key, on a virtual keyboard; and the second contact is a key on the virtual keyboard. According to the setting, pressing the first contact is equivalent to pressing "Shift" or "Ctrl" on the virtual keyboard.

If the input on the virtual keyboard is implemented through clicking, namely first touching and then leaving, which indicates that one symbol is input or one command button is triggered, the above method is "contacting any position on a virtual keyboard displayed on the touch screen through one finger".

If on the virtual keyboard, it indicates that one symbol is input or one command button is triggered no matter whether to leave or not after the touching, the above method is "contacting a position except the keys on a virtual keyboard displayed on the touch screen through one finger". No input operation is performed after leaving since the above method is "the user contacting any position on the virtual keyboard displayed on the touch screen through one finger, in which the finger does not leave the touch screen or move on the touch screen, and clicking an English character key on the virtual keyboard through the other finger", that is, the English character key clicked through the other finger is input at this time, and no input operation is performed when the former finger leaves the touch screen.

Figure 1:
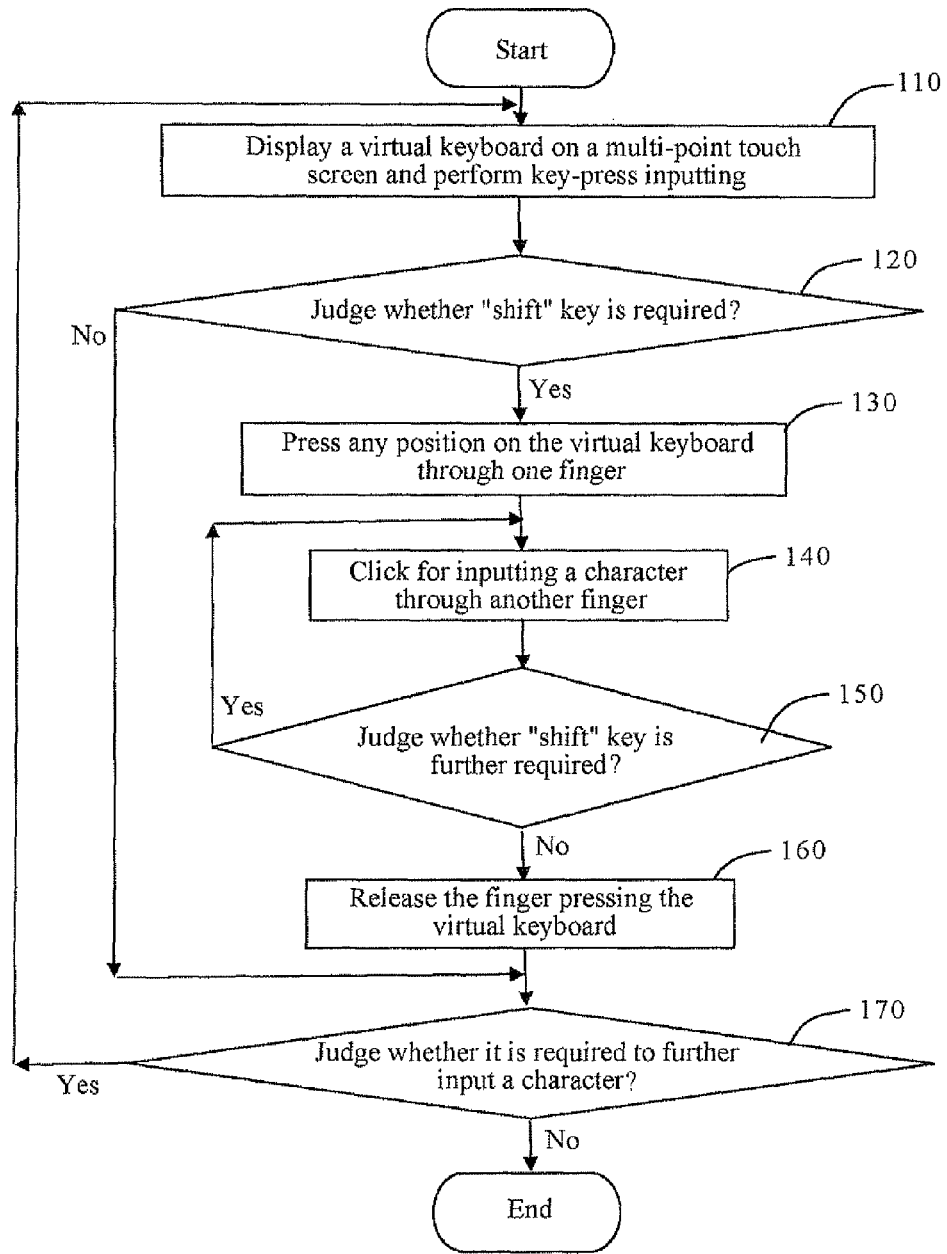
FIG. 1 is a flow chart of a method for implementing the "shift" functional key.

Referring to FIG. 1, the method includes a process of implementing a "shift" functional key, which includes the following steps.

In Step 110, a virtual keyboard is displayed on a multi-point touch screen and key-press inputting is performed.

In Step 120, the user judges whether the "shift" functional key is required to perform an uppercase/lowercase switch; if yes, Step 130 is performed; otherwise, Step 170 is performed.

In Step 130, the user presses any position on the virtual keyboard through one finger.

In Step 140, the user clicks for inputting a character through another finger.

In Step 150, the user judges whether the "shift" functional key is still required to perform the uppercase/lowercase switch; if yes, Step 140 is performed; otherwise, Step 160 is performed.

In Step 160, the finger pressing the virtual keyboard is released.

In Step 170, the user judges whether it is required to further input a character through the virtual keyboard on the multi-point touch screen; if yes, Step 110 is performed; otherwise, the operation is ended.

(2) The present invention may implement input of a small number of specific characters or commands.

In Step A, it is set that the multi-contact operation involves at least two contacts, and a position of each contact is any position on the multi-contact screen or any position, except each key, on the virtual keyboard. When each contact is clicked at the same time, the input character or the operation command is a set character or a set operation command.

For example, the user sets that, when clicking any position of the multi-point touch screen through two fingers at the same time, "space" is input; when clicking any position of the multi-point touch screen through three fingers at the same time, "line feed" is input; and when clicking through four fingers, "backspace" is input. Definitely, some control commands may also be input through similar methods, such as rolling, rotating and scaling of the screen.

The clicking manner may be sliding of the fingers in different directions, and the manners are differentiated through identifying the sliding directions of the fingers on the screen, through which different characters or commands are input respectively. For example, when two fingers rotate clockwise at the same time during the clicking, the corresponding command at this time is rotating the screen clockwise.

Figure 4:
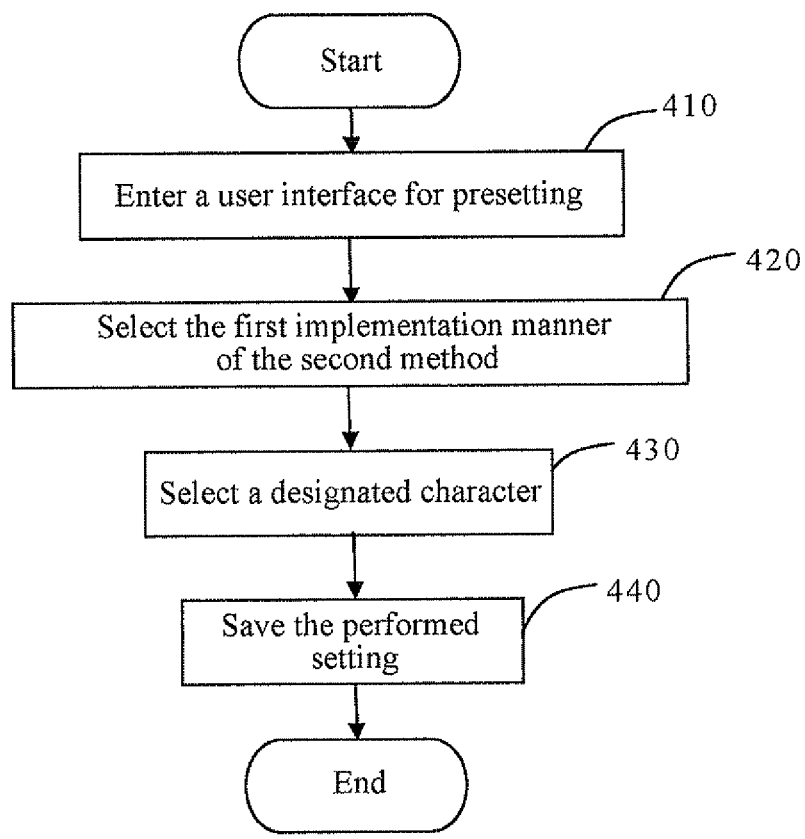
FIG. 4 is a flow chart of presetting so that a user clicks any position on a virtual keyboard of a touch screen through two fingers at the same time to input a designated character.
Figure 5:
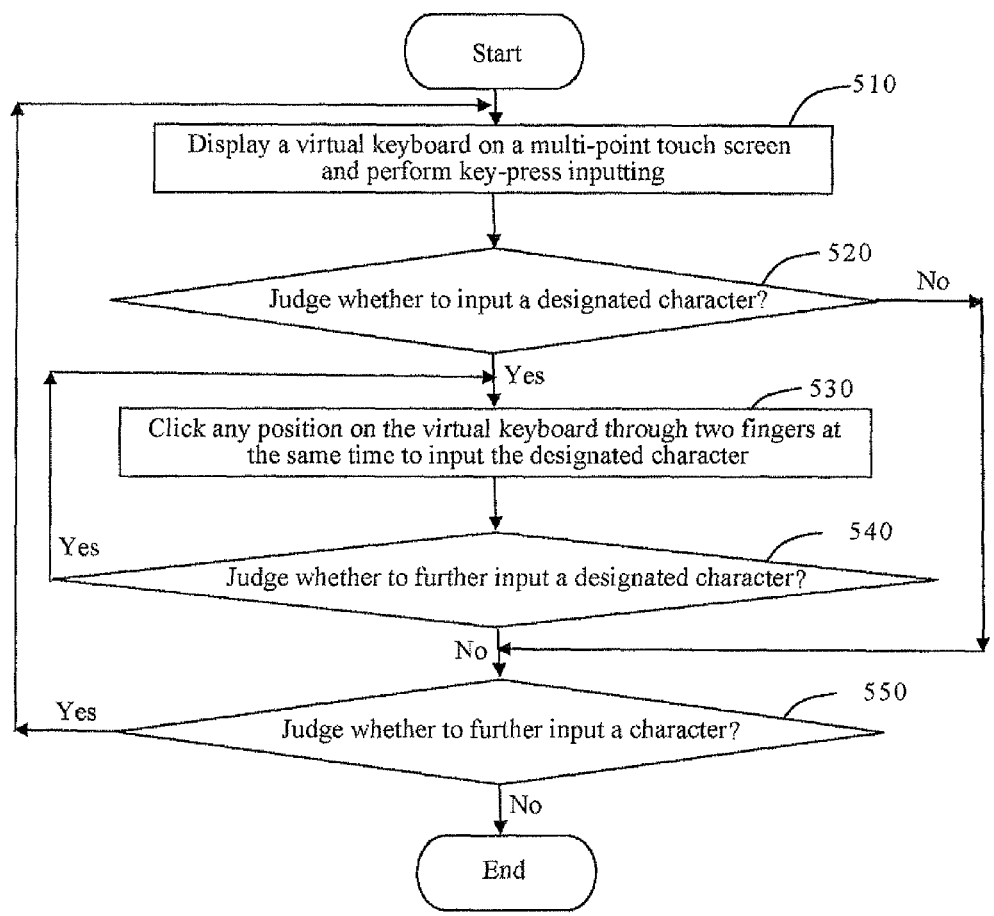
FIG. 5 is a flow chart of a user clicking any position on a virtual keyboard of a touch screen through two fingers at the same time to input a designated character.

Specifically, referring to FIG. 4 and FIG. 5, the method includes a process of presetting a specific character, which includes the following steps.

In Step 410, a user interface for presetting is entered.

In Step 420, the user clicks any position on the virtual keyboard of the touch screen through two fingers at the same time to implement input of a specific character, and designates the specific character as space, backspace or line feed through presetting.

In Step 430, a character corresponding to any position clicked through two fingers at the same time on the virtual keyboard is selected.

In Step 440, the performed setting is saved, and the operation is ended.

The method includes a process of implementing input of a specific character, which includes the following steps.

In Step 510, a virtual keyboard is displayed on a multi-point touch screen and key-press inputting is performed.

In Step 520, the user judges whether it is required to input the designated character; if yes, Step 530 is performed; otherwise, Step 550 is performed.

In Step 530, any position on the virtual keyboard is clicked through two fingers at the same time to implement the input of the designated character.

In Step 540, the user judges whether it is required to further input the designated character; if yes, Step 530 is performed; otherwise, Step 550 is performed.

In Step 550, the user judges whether it is required to further input the character through the virtual keyboard on the multi-point touch screen; if yes, Step 510 is performed; otherwise, the operation is ended.

(3) The present invention may implement input of a large number of specific characters or commands.

In Step A, the multi-point touch screen is divided into several areas, or the area, except each key, on the virtual keyboard is divided into several areas. A position of each contact in the plurality of contacts is distributed in each area. During a multi-contact operation, one area may not have the contact, or have one contact, or have multiple contacts at the same time.

For example, the multi-point touch screen is divided into a left area and a right area, and it is set that: if the left area of the virtual keyboard on the touch screen is clicked through two or more fingers at the same time, a set character or operation command is designated to be input, and if the right area of the virtual keyboard on the touch screen is clicked through two or more fingers at the same time, a set character or operation command is designated to be input; or the left area and the right area are clicked through a set number of fingers respectively, and a set character is input.

Alternatively, the multi-point touch screen is divided into an upper area and a lower area, and it is set that: if the upper area of the virtual keyboard on the touch screen is clicked through two or more fingers at the same time, a set character or operation command is designated to be input, and if the lower area of the virtual keyboard on the touch screen is clicked through two or more fingers at the same time, a set character or operation command is designated to be input; or the upper area and the lower area are clicked through a set number of fingers respectively, a set character is input.

Definitely, the multi-point touch screen may be also divided into four portions of upper left, lower left, upper right and lower right to set a corresponding relation between the touch attribute and the specific character.

After the user pre-designates the specific character, when actually the user clicks the virtual keyboard on the touch screen through fingers at the same time for an input operation, a control program of the virtual keyboard calculates, through a processor of the device, distance parameters between positions clicked by the user through two fingers at this time and the recorded standard input positions of the specific character pre-designated by the user, and a specific character closest to a set value is selected as a character to be input by the user.

Figure 7:
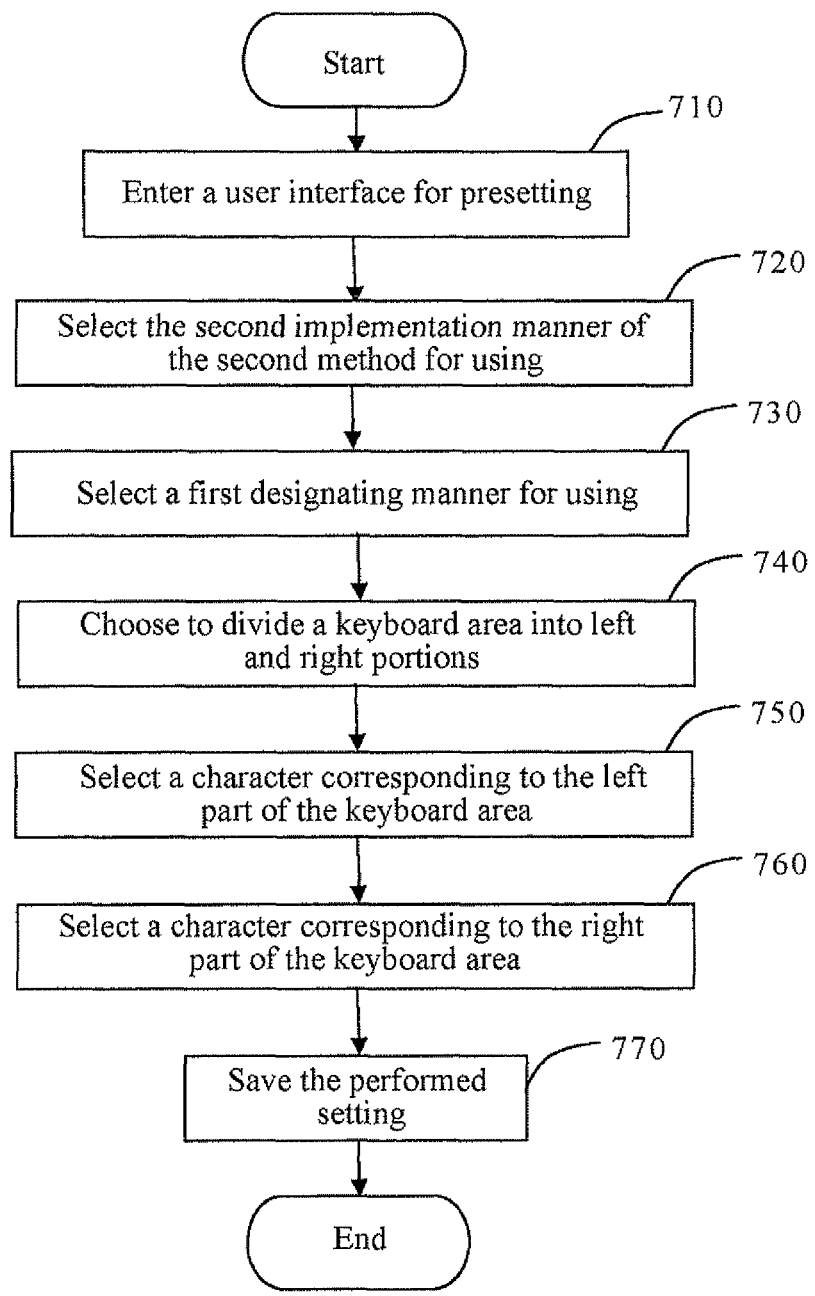
FIG. 7 is a flow chart of presetting through a first designated manner in a second implementation manner of a second method according to Embodiment 2.
Figure 8:
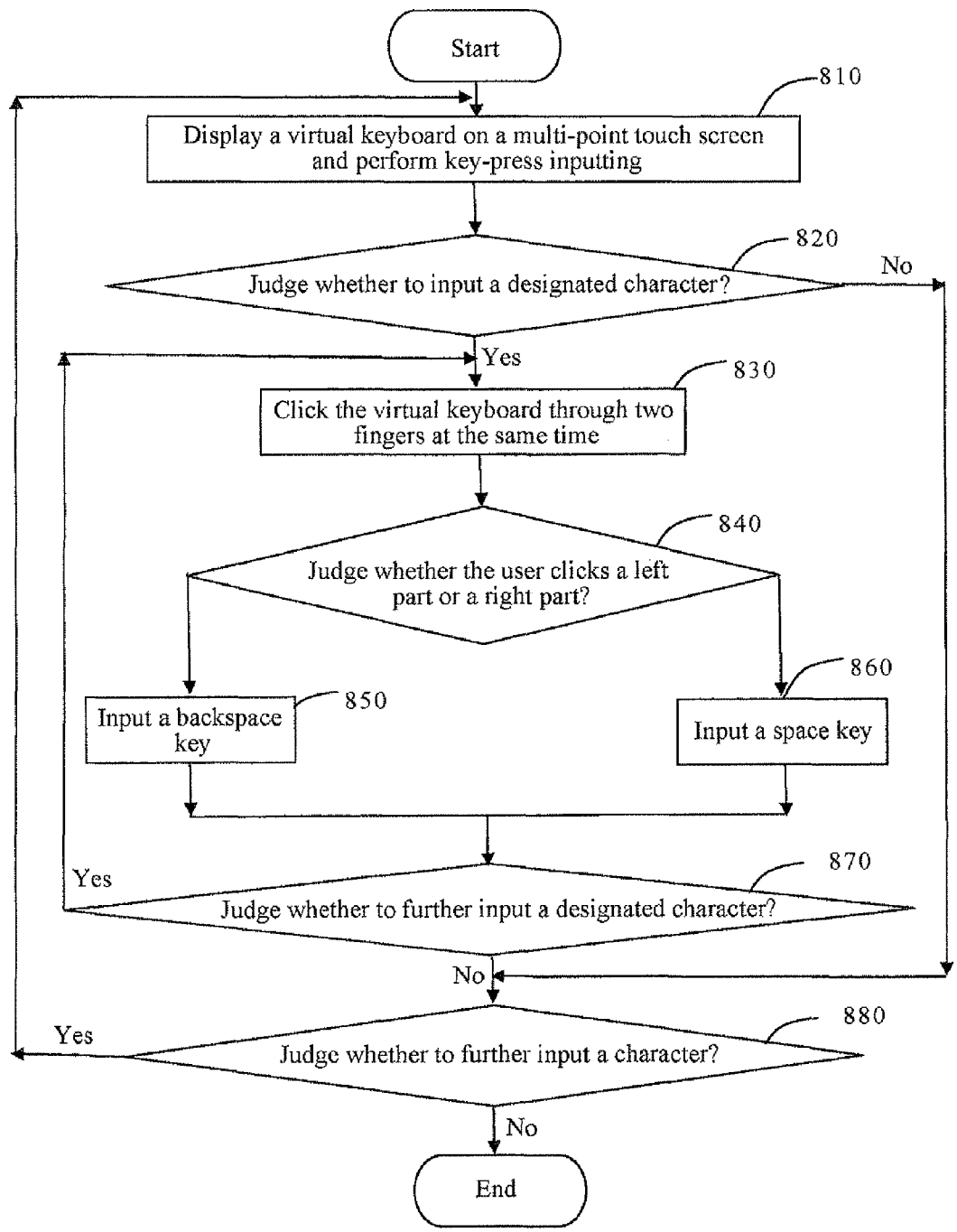
FIG. 8 is a flow chart of a user inputting a designated character after presetting through a first designated manner in a second implementation manner of a second method according to Embodiment 2.

Specifically, referring to FIG. 7 and FIG. 8, the method includes a process of presetting a designated character, which includes the following steps.

In Step 710, a user interface for presetting is entered.

In Step 720, a manner is selected, in which a specific position on the virtual keyboard of the touch screen is clicked through two fingers at the same time to implement the input of a specific character.

In Step 730, the virtual keyboard is divided into a left half portion and a right half portion.

In Step 740, it is chosen that the keyboard area is divided into left and right portions.

In Step 750, a character is selected, which corresponds to that the left area of the keyboard is clicked through two fingers at the same time.

In Step 760, a character is selected, which corresponds to that the right area of the keyboard is clicked through two fingers at the same time.

In Step 770, the performed setting is saved and the operation is ended.

The method includes a process of implementing input of a designated character, which includes the following steps.

In Step 810, a virtual keyboard is displayed on a multi-point touch screen and key-press inputting is performed.

In Step 820, the user judges whether it is required to input a designated character; if yes, Step 830 is performed; otherwise, Step 880 is performed.

In Step 830, the virtual keyboard is clicked through two fingers at the same time, and positions x1 and x2 clicked through the two fingers in x direction are recorded.

In Step 840, the system judges whether the user clicks the left part or the right part of the virtual keyboard through two fingers at the same time; if the user clicks the left part, Step 850 is performed, and if the user clicks the right part, Step 860 is performed.

The judging may be performed through the following method. If a position of a central line for dividing a left part and a right part on the virtual keyboard on the multi-point touch screen is x0, a value val=(x1−x0)+(x2−x0) is calculated, and if val<=0, it indicates that the user clicks the left part of the virtual keyboard through the two fingers at the same time; otherwise, it indicates that the user clicks the right part of the virtual keyboard through the two fingers at the same time.

In Step 850, a character corresponding to the left part of the virtual keyboard is input, which is a backspace functional key, and Step 870 is performed.

In Step 860, a character corresponding to the right part of the virtual keyboard is input, which is a space key, and Step 870 is performed.

In Step 870, the user judges whether it is required to further input the designated character, if yes, Step 830 is performed; otherwise, Step 880 is performed.

In Step 880, the user judges whether it is required to further input the character through the virtual keyboard on the multi-point touch screen, if yes, Step 810 is performed; otherwise, the operation is ended.

(4) The present invention may implement input of a large number of specific characters or commands through setting a touch position arbitrarily by the user.

When the user designates a specific character, the user clicks the virtual keyboard on the touch screen through at least two (or more) fingers at the same time, and a position clicked through each finger at this time is recorded as a standard input position of the specific character.

After the user pre-designates the specific character, when actually the user clicks the virtual keyboard on the touch screen through fingers at the same time for an input operation, a control program of the virtual keyboard calculates parameters of distances between positions clicked by the user through two fingers at this time and the recorded standard input positions of the specific character pre-designated by the user through a processor of the device, and a specific character closest to a set value is selected as a character to be input by the user. During the calculation of the distance, the distance parameters may be a distance corresponding each point, or a square of the distance, or other parameters related to the distance. During selection of a point corresponding to a set point, since each set point group has multiple set points, when a corresponding touch point of each set point is selected, a touch point closest to the set point is selected as the corresponding touch point of the set point.

For example, clicked positions of two fingers are (x1, y1) and (x2, y2), and n specific characters are set, standard clicked positions corresponding to an $i^{th}$ specific character are (x1i, y1i) and (x2i, y2i). When a point corresponding to (x1i, y1i) is selected, the touch point (x1, y1) closest to the point (x1i, y1i) is selected as the corresponding touch point thereof, and then a point corresponding to the point (x2i, y2i) is (x2, y2).

Figure 11:
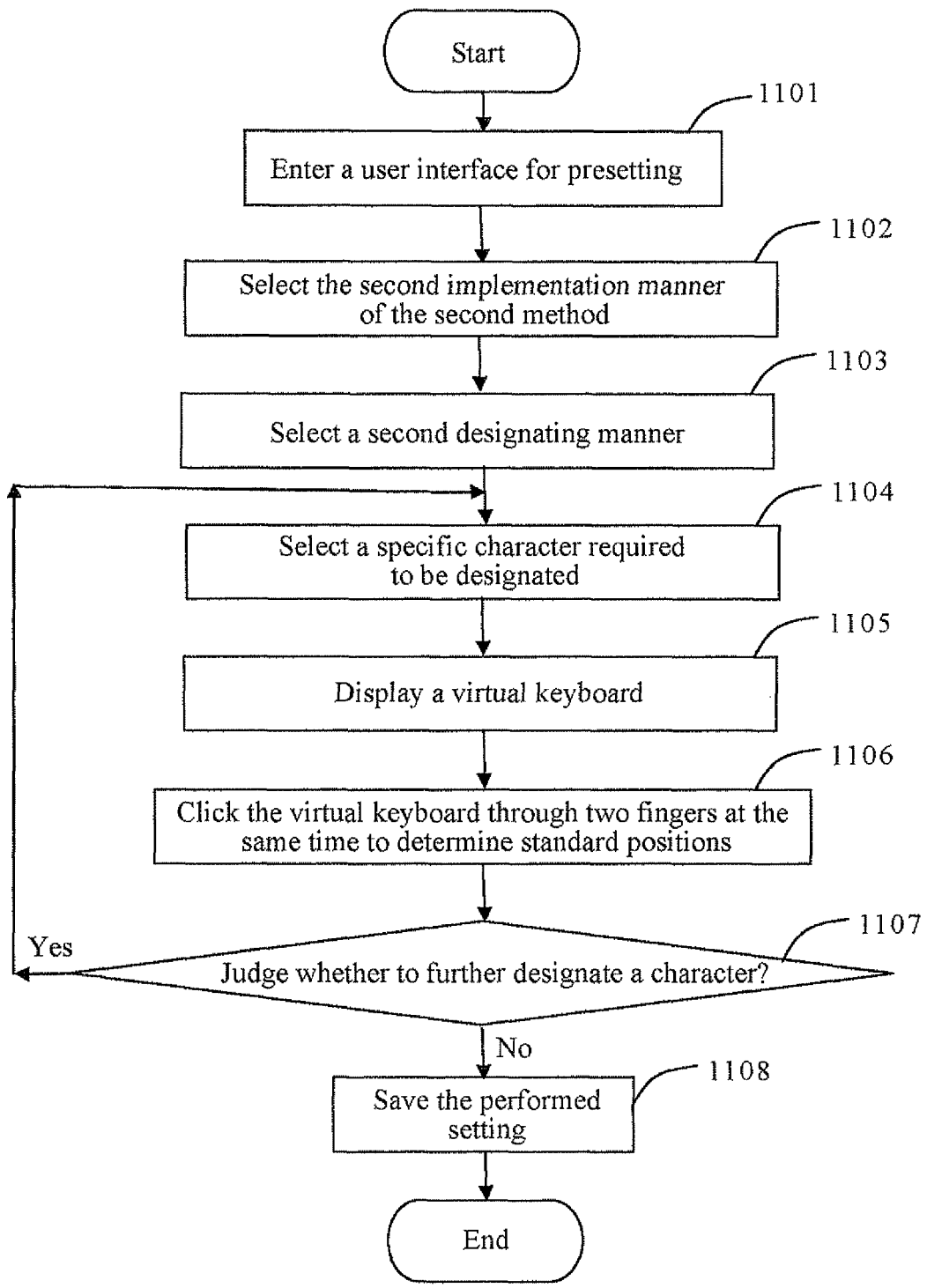
FIG. 11 is a flow chart of presetting through a second designated manner in a second implementation manner of a second method according to Embodiment 2.
Figure 12:
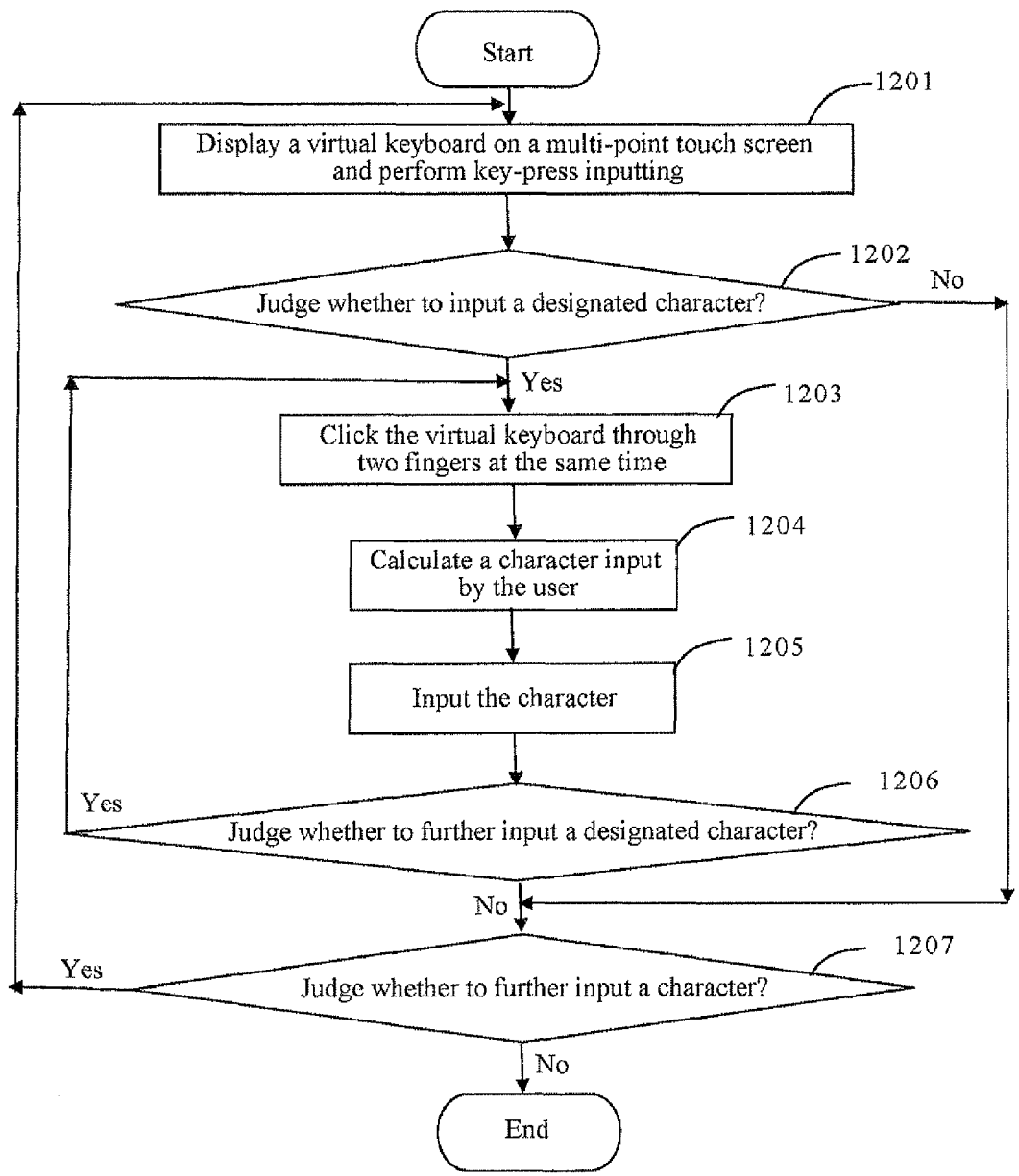
FIG. 12 is a flow chart of a user inputting a designated character after presetting through a second designated manner in a second implementation manner of a second method according to Embodiment 2.

Specifically, referring to FIG. 11 and FIG. 12, the method includes a process of presetting a designated character, which includes the following steps.

In Step 1101, a user interface for presetting is entered.

In Step 1102, a manner is selected, in which a specific position on the virtual keyboard of the touch screen is clicked through two fingers at the same time to implement the input of a specific character.

In Step 1103, a manner is selected, in which the area of the virtual keyboard on the touch screen is not rigidly divided.

In Step 1104, a specific character required to be designated is selected.

In Step 1105, the area of the virtual keyboard is displayed.

In Step 1106, the user clicks the virtual keyboard on the touch screen through two fingers at the same time, and positions clicked through the two fingers at this time are recorded as standard input positions of the specific character.

In Step 1107, the user judges whether it is required to further designate a specific character; if yes, Step 1104 is performed; otherwise, Step 1108 is performed.

In Step 1108, the performed setting is saved and the operation is ended.

The method includes a process of implementing input of a designated character, which includes the following steps.

In Step 1201, a virtual keyboard is displayed on a multi-point touch screen and key-press inputting is performed.

In Step 1202, the user judges whether it is required to input a designated character; if yes, Step 830 is performed; otherwise, Step 880 is performed.

In Step 1203, the user clicks the virtual keyboard through two fingers at the same time, and the positions (x1, y1) and (x2, y2) clicked through the two fingers are recorded.

In Step 1204, the system calculates a character the user wants to input according to the positions clicked by the user through two fingers on the virtual keyboard and the standard positions of the specific character stored in the presetting step.

The calculation is performed through the following method. n specific characters are stored in the presetting step, and the standard clicked positions corresponding to the $i^{th}$ specific character are $(x1i, y1i)$ and $(x2i, y2i)$. A value of a position parameter $VAL_i$ ($i=1, 2, 3, \ldots, n$) of the n groups of points is calculated, in which $VAL_i=(x1-x1i)*(x1-x1i)+(y1-y1i)*(y1-y1i)+(x2-x2i)*(x2-x2i)+(y2-y2i)*(y2-y2i)$, and a specific character corresponding to the smallest value $VAL_i$ is selected as a character the user wants to input.

In Step 1205, the character obtained through calculation which the user wants to input is input.

In Step 1206, the user judges whether it is required to further input the designated character; if yes, Step 1203 is performed; otherwise, Step 1207 is performed.

In Step 1207, the user judges whether it is required to further input a character through the virtual keyboard on the multi-point touch screen; if yes, Step 1201 is performed; otherwise, the operation is ended.

To sum up, the multi-contact character input method of the present invention fully utilizes the advantages of the multi-point touch sensing, and uses a multi-point touch combination of a specific manner to implement the input of frequently used functional keys or character keys, and provides input convenience for the user without requiring the user to change a click input mode.

In addition, in the above examples, the clicking manner may be sliding of the fingers in different directions, and the manners are differentiated through identifying the sliding directions of the fingers on the screen, through which different characters or commands are input respectively. Meanwhile, the characters or the control commands, such as rolling, rotating and scaling of the screen, are input.

Embodiment 2

As for the problems existing in the case in which characters are input through a keyboard in a multi-point touch sensing apparatus including a multi-point touch screen, the present invention provides the following two methods for the user to conveniently input frequently used functional keys or characters keys of "shift" (that is, an uppercase/lowercase switch during input of English characters), space, and backspace (that is, deleting the previously input character) and line feed through clicking on a virtual keyboard of a touch screen or a touch sensing keyboard.

In the following method, input through the virtual keyboard on the multi-point touch screen is taken as an example, which is also applicable to other virtual keyboards or actual keyboards having a multi-point touch sensing apparatus. Fingers mentioned in the following description may also be a stylus pen or other tools for operating the touch screen.

In the first method, a user contacts any position on the virtual keyboard displayed on the touch screen through one finger, and the finger does not leave the touch screen or move on the touch screen. When an English character key on the virtual keyboard is clicked through another finger, an English character after the uppercase/lowercase switch is input. That is to say, though the user is not required to actually press the "shift" key, it is equivalent to pressing the "shift" key, and the character input is implemented through pressing other keys. In this way, the "shift" key is conveniently clicked and used.

In the second method, the user clicks the virtual keyboard on the touch screen through two fingers at the same time to implement input of a specific character. The method has the following two implementation manners.

In the first implementation manner, the user clicks any position on the virtual keyboard of the touch screen through two fingers at the same time to implement input of a specific character, in which the user may designate the specific character as space, backspace (that is, deleting a previously input character) or line feed through presetting. In this way, the specific character pre-designated by the user is conveniently clicked and input.

In the second implementation manner, the user clicks specific positions on the virtual keyboard of the touch screen through two fingers at the same time to implement input of a specific character, in which the user may designate the specific character corresponding to the specific positions on the virtual keyboard as space, backspace (that is, deleting a previously input character) or line feed through presetting.

In the second implementation manner of the second method according to Embodiment 2, the user may designate the specific character corresponding to the specific positions on the virtual keyboard of the touch screen through two manners.

In the first designating manner, the area of the virtual keyboard on the touch screen is rigidly divided, and then the user designates the input character corresponding that a specific area on the touch screen is clicked through two fingers at the same time. For example, the virtual keyboard is divided into a left half portion and a right half portion. The user may preset that if the left half portion of the virtual keyboard on the touch screen is clicked through two fingers at the same time, backspace (that is, deleting a previously input character) is designated to be input; if the right half portion of the virtual keyboard on the touch screen is clicked through two fingers at the same time, space is designated to be input. Other dividing or designating involving an upper half portion and a lower half portion may also be performed, thereby facilitating the input of the specific character.

In the second designating manner, the area of the virtual keyboard on the touch screen is not rigidly divided, and when the user designates a specific character, the user clicks the virtual keyboard on the touch screen through two fingers at the same time, and positions clicked through the two fingers at this time are recorded as standard input positions of the specific character. After the user pre-designates two or more specific characters, when actually the user clicks the virtual keyboard on the touch screen through two fingers at the same time for an input operation, a control program of the virtual keyboard calculates, through a Central Processing Unit (CPU) and a memory of the device, distances between positions clicked by the user through the two fingers at this time and the recorded standard input positions of the specific character pre-designated by the user, and a specific character closest to the clicked position is selected as a character to be input by the user.

In the second method of Embodiment 2, the clicking the display screen through two fingers refers to performing an clicking operation on the display screen through both fingers, and a time difference between the two fingers contacting the display screen or leaving the display screen does not exceed a certain preset threshold, for example, 10 milliseconds (ms).

In the specific implementation, the above two methods and each implementation manner may be integrated for using, or may be separately used.

Embodiment 3

As for the first method in Embodiment 2, a flow chart of a method for implementing the "shift" functional key is shown in FIG. 1, which includes the following steps.

In Step 110, a virtual keyboard is displayed on a multi-point touch screen and key-press inputting is performed.

In Step 120, the user judges whether the "shift" functional key is required to perform an uppercase/lowercase switch; if yes, Step 130 is performed; otherwise, Step 170 is performed.

In Step 130, the user presses any position on the virtual keyboard through one finger.

In Step 140, the user clicks for inputting a character through another finger.

In Step 150, the user judges whether the "shift" functional key is still required to perform the uppercase/lowercase switch; if yes, Step 140 is performed; otherwise, Step 160 is performed.

In Step 160, the finger pressing the virtual keyboard is released.

In Step 170, the user judges whether it is continuously required to further input a character through the virtual keyboard on the multi-point touch screen; if yes, Step 110 is performed; otherwise, the operation is ended.

Figure 2A:
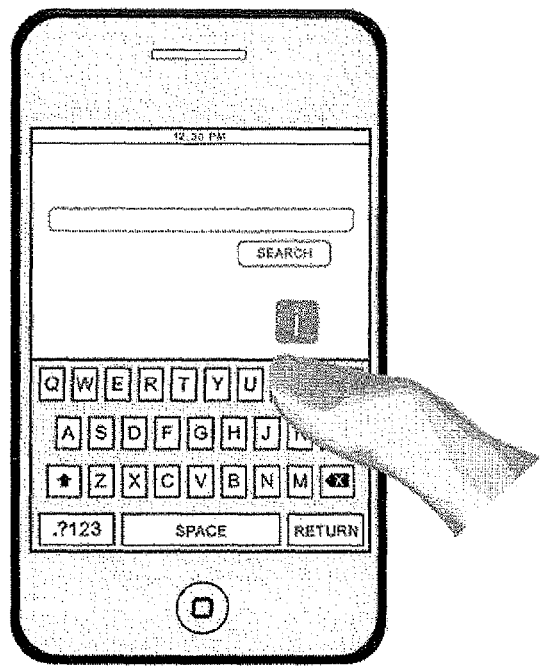
FIG. 2a indicates that when the key "I" on the virtual keyboard is clicked alone, a lowercase character "i" is input.
Figure 2B:
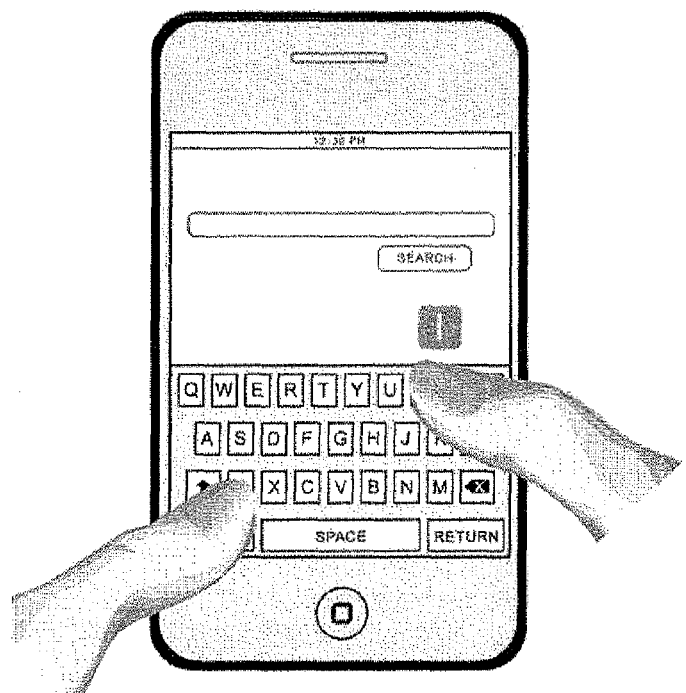
FIG. 2b indicates that when a certain position at the left of the virtual keyboard is pressed and then the key "I" on the virtual keyboard is clicked, an uppercase character "I" is input.

FIG. 2 illustrates an example of implementing the "shift" functional key by pressing the virtual keyboard on the touch screen through a left hand finger. FIG. 2(a) illustrates that when the user clicks a letter "i" on the keyboard through one finger alone, a lowercase "i" is input; and FIG. 2(b) illustrates that when the user first presses a certain position on the virtual keyboard of the touch screen through a left hand finger and then clicks the letter "i" on the keyboard through a right hand finger, an uppercase "I" is input.

Figure 3A:
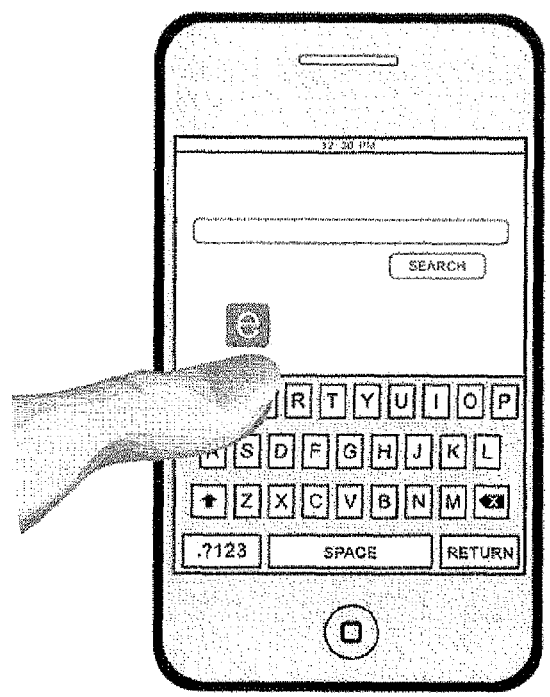
FIG. 3a indicates that when the key "E" on the virtual keyboard is clicked alone, a lowercase character "e" is input.
Figure 3B:
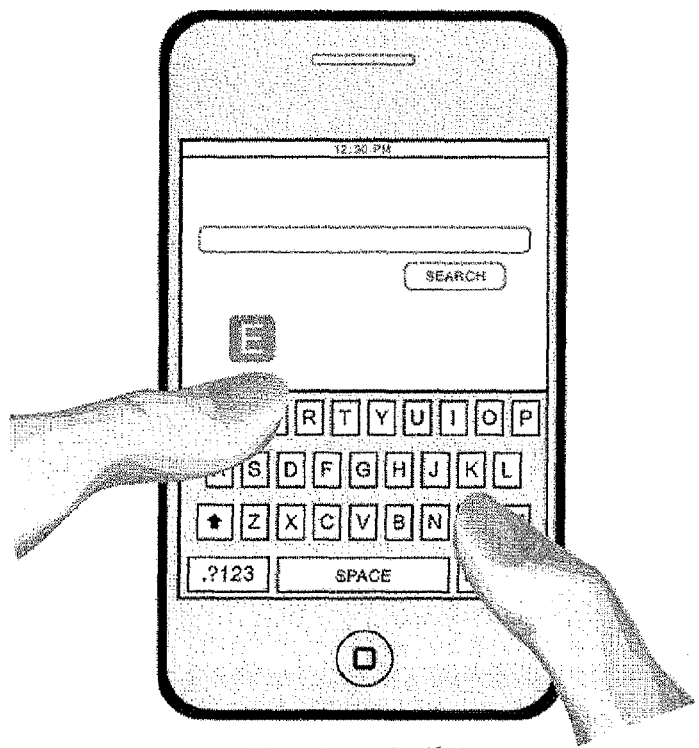
FIG. 3b indicates that when a certain position at the right of the virtual keyboard is pressed and then the key "E" on the virtual keyboard is clicked, an uppercase character "E" is input.

FIG. 3 illustrates an example of implementing the "shift" functional key by pressing the virtual keyboard on the multi-point touch screen through a right hand finger. FIG. 3(a) illustrates that when the user clicks a letter "e" on the keyboard through one finger alone, a lowercase "e" is input; and FIG. 3(b) illustrates that when the user first presses a certain position on the virtual keyboard of the multi-point touch screen through a right hand finger and then clicks the letter "e" on the keyboard through a left hand finger, an uppercase "E" is input.

Embodiment 4

As for the second method of Embodiment 2, a flow chart of the first implementation manner is shown in FIG. 4 and FIG. 5, which includes the following steps.

FIG. 4 illustrates a process of designating a specific character through presetting by a user, which includes the following steps.

In Step 410, a user interface for presetting is entered.

In Step 420, the first implementation manner of the second method of Embodiment 2 is selected.

In Step 430, a character corresponding to any position clicked through two fingers at the same time on the virtual keyboard is selected, which is a space character herein by assumption.

In Step 440, the performed setting is saved and the operation is ended.

FIG. 5 illustrates a process of a user implementing input of a designated character, which includes the following steps.

In Step 510, a virtual keyboard is displayed on a multi-point touch screen and key-press inputting is performed.

In Step 520, the user judges whether it is required to input the designated character; if yes, Step 530 is performed; otherwise, Step 550 is performed.

In Step 530, any position on the virtual keyboard is clicked through two fingers at the same time to implement the input of the designated character.

In Step 540, the user judges whether it is required to further input the designated character; if yes, Step 530 is performed; otherwise, Step 550 is performed.

In Step 550, the user judges whether it is required to further input the character through the virtual keyboard on the multi-point touch screen; if yes, Step 510 is performed; otherwise, the operation is ended.

Figure 6:
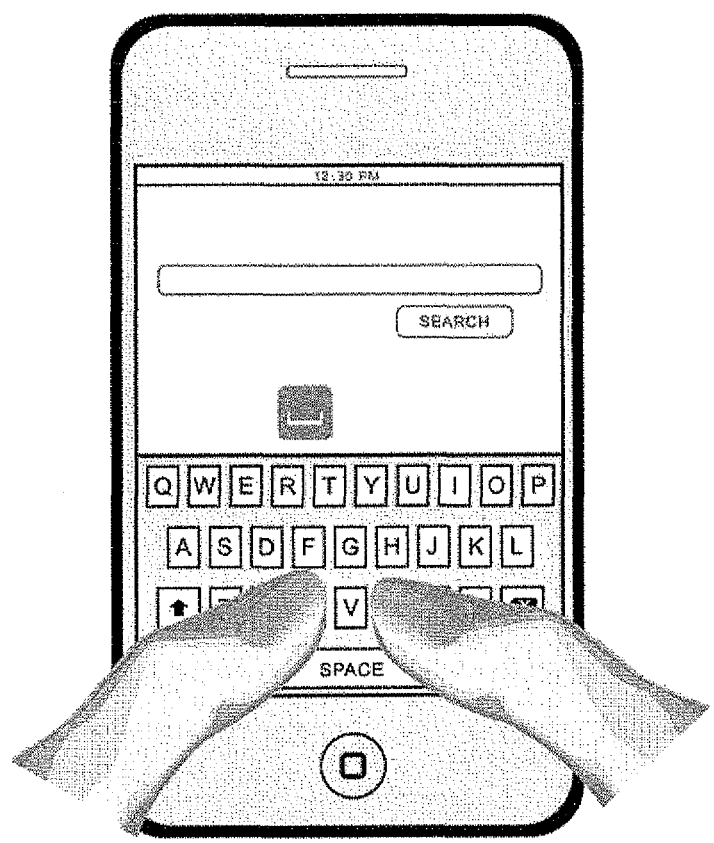
FIG. 6 illustrates an example of a user clicking any position on a virtual keyboard of a touch screen through two fingers at the same time to input a space character.

FIG. 6 illustrates an example of implementing input of a space character by clicking any position on the virtual keyboard through two fingers at the same time.

Embodiment 5

In the second implementation manner of the second method of Embodiment 2, a flow chart of the first designating manner is shown in FIG. 7 and FIG. 8, which includes the following steps. It is assumed herein that, the user chooses to divide the area of the virtual keyboard on the touch screen into left and right portions, and the implementation steps are the same for other division manners of the keyboard area.

FIG. 7 illustrates a process of designating a specific character through presetting by a user, which includes the following steps.

In Step 710, a user interface for presetting is entered.

In Step 720, the second implementation manner of the second method of Embodiment 2 is selected for using.

In Step 730, the first designating manner is selected for using.

In Step 740, it is chosen that the keyboard area is divided into left and right portions.

In Step 750, a character corresponding to the left part of the keyboard area is selected, which is a backspace functional key herein by assumption.

In Step 760, a character corresponding to the right part of the keyboard area is selected, which is a space key herein by assumption.

In Step 770, the performed setting is saved and the operation is ended.

FIG. 8 illustrates a process of the user implementing input of a designated character, which includes the following steps.

In Step 810, a virtual keyboard is displayed on a multi-point touch screen and key-press inputting is performed.

In Step 820, the user judges whether it is required to input the designated character; if yes, Step 830 is performed; otherwise, Step 880 is performed.

In Step 830, the virtual keyboard is clicked through two fingers at the same time, and positions x1 and x2 clicked through the two fingers in x direction are recorded.

In Step 840, the system judges whether the user clicks the left part or the right part of the virtual keyboard through two fingers at the same time; if the user clicks the left part, Step 850 is performed, and if the user clicks the right part, Step 860 is performed.

The judging may be performed through the following method. If a position of a central line for dividing a left part and a right part on the virtual keyboard on the multi-point touch screen is x0, a value $val=(x1-x0)+(x2-x0)$ is calculated, and if $val<=0$, it indicates that the user clicks the left part of the virtual keyboard through the two fingers at the same time; otherwise, it indicates that the user clicks the right part of the virtual keyboard through the two fingers at the same time.

In Step 850, a character corresponding to the left part of the virtual keyboard is input, which is a backspace functional key, and Step 870 is performed.

In Step 860, a character corresponding to the right part of the virtual keyboard is input, which is a space key, and Step 870 is performed.

In Step 870, the user judges whether it is required to further input the designated character, if yes, Step 830 is performed; otherwise, Step 880 is performed.

In Step 880, the user judges whether it is required to further input the character through the virtual keyboard on the multi-point touch screen, if yes, Step 810 is performed; otherwise, the operation is ended.

Figure 9:
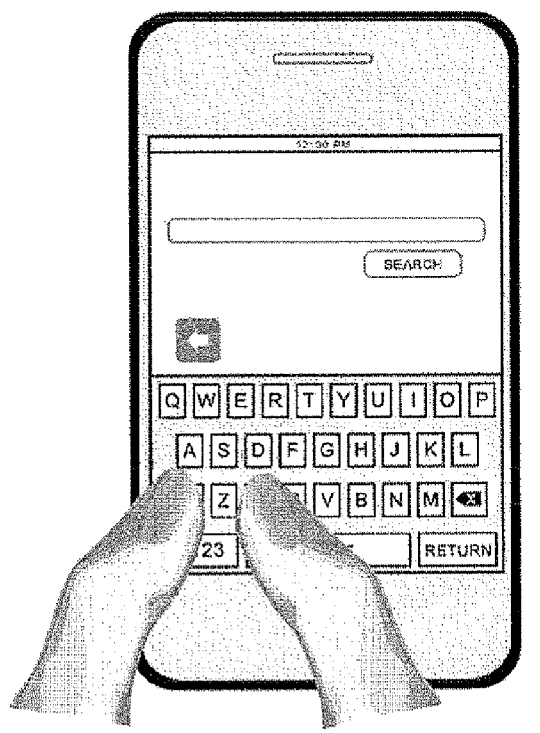
FIG. 9 illustrates an example of a user clicking a left half portion of a virtual keyboard of a touch screen through two fingers at the same time to input a backspace functional key.

FIG. 9 illustrates an example of implementing input of a backspace functional key by clicking a left part of the virtual keyboard through two fingers at the same time.

Figure 10:
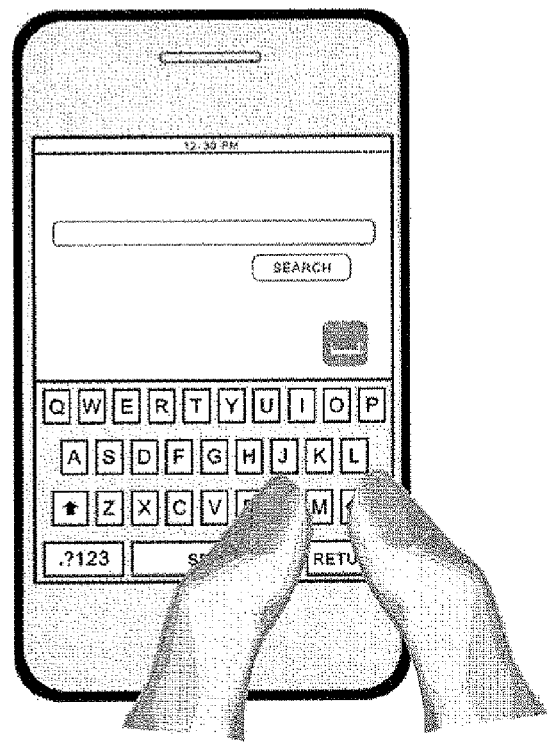
FIG. 10 illustrates an example of a user clicking a right half portion of a virtual keyboard of a touch screen through two fingers at the same time to input a space character.

FIG. 10 illustrates an example of implementing input of a space character by clicking a right part of the virtual keyboard through two fingers at the same time.

Embodiment 6

In the second implementation manner of the second method of Embodiment 2, a flow chart of the second designating manner is shown in FIG. 11 and FIG. 12, which includes the following steps. It is assumed herein that, the user chooses to divide the area of the virtual keyboard on the touch screen into left and right portions, and the implementation steps are to the same for other division manners of the keyboard area.

FIG. 11 illustrates a process of designating a specific character through presetting by a user, which includes the following steps.

In Step 1101, a user interface for presetting is entered.

In Step 1102, the second implementation manner of the second method of Embodiment 2 is selected for using.

In Step 1103, the second designating manner is selected for using.

In Step 1104, a specific character required to be designated is selected.

In Step 1105, the area of the virtual keyboard is displayed.

In Step 1106, the user clicks the virtual keyboard on the touch screen through two fingers at the same time, and positions clicked through the two fingers at this time are recorded as standard input positions of the specific character.

In Step 1107, the user judges whether it is required to further designate a specific character; if yes, Step 1104 is performed; otherwise, Step 1108 is performed.

In Step 1108, the performed setting is saved and the operation is ended.

FIG. 12 illustrates a process of the user implementing input of a designated character, which includes the following steps.

In Step 1201, a virtual keyboard is displayed on a multi-point touch screen and key-press inputting is performed.

In Step 1202, the user judges whether it is required to input the designated character; if yes, Step 830 is performed; otherwise, Step 880 is performed.

In Step 1203, the user clicks the virtual keyboard through two fingers at the same time, and the positions (x1, y1) and (x2, y2) clicked through the two fingers are recorded.

In Step 1204, the system calculates a character the user wants to input according to the positions clicked by the user through two fingers on the virtual keyboard and the standard positions of the specific character stored in the presetting described in FIG. 11.

The calculation may be performed through the following method. n specific characters are stored in the presetting described in FIG. 11, and the standard clicked positions corresponding to the $i^{th}$ specific character are (x1i, y1i) and (x2i, y2i). n values are calculated, in which $VALi=(x1-x1i)*(x1-x1i)+(y1-y1i)*(y1-y1i)+(x2-x2i)*(x2-x2i)+(y2-y2i)*(y2-y2i)$, where i=1, 2, 3, . . . , n, and a specific character corresponding to the smallest value VAL is selected as a character the user wants to input.

In Step 1205, the character obtained through calculation which the user wants to input is input.

In Step 1206, the user judges whether it is required to further input the designated character; if yes, Step 1203 is performed; otherwise, Step 1207 is performed.

In Step 1207, the user judges whether it is required to further input a character through the virtual keyboard on the multi-point touch screen; if yes, Step 1201 is performed; otherwise, the operation is ended.

Embodiment 7

Figure 13:
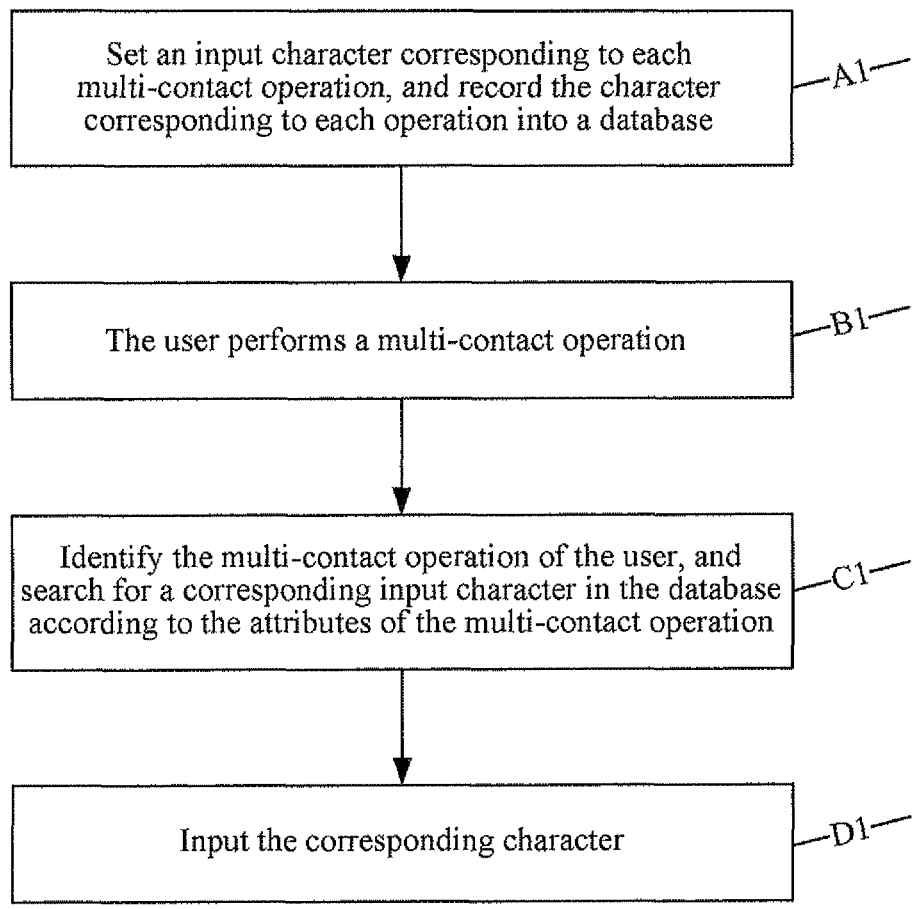
FIG. 13 is a flow chart of the present invention.

Referring to FIG. 13, the present invention provides a multi-contact character input method, which includes the following steps:

A1. setting an input character or/and an operation command corresponding to each multi-contact operation, and recording the character or/and the operation command corresponding to each operation into a database, in which attributes of the multi-contact operation include a position of each contact in a plurality of contacts, or/and the number of contacts of fingers contacting a multi-point touch screen within the same time, or/and a sliding direction of each finger;

B1. a user performing a multi-contact operation;

C1. identifying the multi-contact operation of the user, and searching the database for a corresponding input character or operation command according to the attributes of the multi-contact operation; and D1. inputting the corresponding character or operation command.

The present invention also provides a multi-contact character input system, which includes:

a multi-contact operation setting module, used for setting an input character or/and an operation command corresponding to each multi-contact operation, in which attributes of the multi-contact operation include a position of each contact in a plurality of contacts, or/and the number of contacts contacting a multi-point touch screen within the same time, or/and a sliding direction of each contact;

a database, used for recording a character or/and an operation command corresponding to each multi-contact operation;

an operation identifying module, used for identifying the multi-contact operation of a user; and an operation parsing module, used for obtaining a corresponding input character or operation command from the database according to the attributes of the multi-contact operation.

To sum up, the multi-contact character input method and system of the present invention fully utilize the advantages of the multi-point touch sensing, and use a multi-point touch combination of a specific manner to implement the input of frequently used functional keys or character keys, and provide input convenience for the user without requiring the user to change a click input mode.

Embodiment 8

To implement the present invention, the following hardware conditions are required.

In the device, a general operation and storage apparatus is required, which includes a CPU with a certain frequency, a memory for operation, and a storage space for storing system software, application software and various data.

In the device, a multi-point touch sensing apparatus is required, such as a touch screen or a touch sensing keyboard, and states such as contacting, moving and leaving of one or more touch points may be sensed in a touch sensing area of the touch screen or the touch sensing keyboard.

In the multi-point touch sensing apparatus of the device, a keyboard for a user to input English letters is required, such as a 9-key keyboard or a qwerty virtual keyboard displayed on the touch screen.

For example, the present invention may be applied in iPhone of Apple Company, in which a display of the cell phone is a 3.5-inch multi-point touch screen with 480*320 pixels, and the cell phone has a 620 MHz ARM CPU and 8 G memory capacity.

The description and application of the present invention here are merely for exemplary purpose, and are not intended to limit the scope of the present to the above embodiments. The variations and modifications of the embodiments disclosed herein are possible, and for persons with ordinary skill in the art, the replacement and various equivalent parts in the present invention are publicly known. It should be noted for persons skilled in the art that, the present invention may be implemented through other forms, structures, arrangements, proportions and other components, materials and parts without departing from the spirit and essential features of the present invention. Other deformations and variations may be made to the embodiments disclosed here without departing from the scope and spirit of the present invention.

What is claimed is:

1. A multi-contact character input method, comprising:
   A1. setting an input character corresponding to each multi-contact operation, and recording the character or/and an operation command corresponding to each operation into a database, wherein attributes of the multi-contact operation comprise a position of each contact in a plurality of contacts, or/and the number of contacts of fingers contacting a multi-point touch screen within the same time, or/and a sliding direction of each finger;
   B1. a user performing a multi-contact operation;
   C1. identifying the multi-contact operation of the user, and searching for a corresponding input character in the database according to the attributes of the multi-contact operation; and
   D1. inputting the corresponding character.

2. A multi-contact character input method, comprising:
   A. setting an input character corresponding to each multi-contact operation, wherein attributes of the multi-contact operation comprise a position of each contact in a plurality of contacts, or/and the number of contacts contacting a multi-point touch screen within the same time, or/and a sliding direction of each contact;
   B. a user performing a multi-contact operation;
   C. identifying the multi-contact operation of the user, and obtaining a corresponding input character according to the attributes of the multi-contact operation; and
   D. inputting the corresponding character.

3. The multi-contact character input method as in claim 2, wherein,
   in Step A, the multi-contact operation is set to involve two contacts: a first contact and a second contact;
   a position of the first contact is any position on the multi-contact screen or any position, except each key, on a virtual keyboard; and the second contact is a key on the virtual keyboard; and
   according to setting, pressing the first contact is equivalent to pressing "Shift" or "Ctrl" of the virtual keyboard.

4. The multi-contact character input method as in claim 2, wherein,
   in Step A, the multi-contact operation is set to involve at least two contacts, a position of each contact is any position on the multi-contact screen, or any position, except each key, on the virtual keyboard; and
   when each contact is clicked at the same time, a set character is input.

5. The multi-contact character input method as in claim 2, wherein,
   in Step A, the multi-point touch screen is divided into several areas, or the area, except each key, on the virtual keyboard is divided into several areas;
   a position of each contact in the plurality of contacts is distributed in each area; and
   during a multi-contact operation, one area has no contact, or has one contact, or has multiple contacts at the same time.

6. The multi-contact character input method as in claim 5, wherein,
   the multi-point touch screen is divided into a left area and a right area, and it is set that: if the left area of the virtual keyboard on the touch screen is clicked through two or more fingers at the same time, a set character is designated to be input, and if the right area of the virtual keyboard on the touch screen is clicked through two or more fingers at the same time, a set character is designated to be input; or the left area and the right area are clicked through a set number of fingers respectively to input a set character;
   or, the multi-point touch screen is divided into an upper area and a lower area, and it is set that if the upper area of the virtual keyboard on the touch screen is clicked through two or more fingers at the same time, a set character is designated to be input, and if the lower area of the virtual keyboard on the touch screen is clicked through two or more fingers at the same time, a set character is designated to be input; or the upper area and the lower area are clicked through a set number of fingers respectively to input a set character.

7. The multi-contact character input method as in claim 2, wherein,
   when the user designates a specific character, the user clicks the virtual keyboard on the touch screen through at least two fingers at the same time, and a position clicked by each finger at this time is recorded as a standard input position of the specific character;
   after the user pre-designates the specific character, when actually the user clicks the virtual keyboard on the touch screen through fingers at the same time for an input operation, a control program of the virtual keyboard calculates, a processor of the device, distance parameters between positions clicked by the user through two fingers at this time and the recorded standard input positions of the specific character pre-designated by the user through, and a specific character closest to a set value is selected as a character to be input by the user.

8. The multi-contact character input method as in claim 2, wherein, the method comprises a process of implementing the "shift" functional key, which comprises the following steps:

in Step 110, a virtual keyboard is displayed on a multi-point touch screen and key-press inputting is performed;

in Step 120, the user judges whether the "shift" functional key is required to perform an uppercase/lowercase switch; if yes, Step 130 is performed; otherwise, Step 170 is performed;

in Step 130, the user presses any position on the virtual keyboard through one finger;

in Step 140, the user clicks for inputting a character through another finger;

in Step 150, the user judges whether the "shift" functional key is still required to perform the uppercase/lowercase switch; if yes, Step 140 is performed; otherwise, Step 160 is performed;

in Step 160, the finger pressing the virtual keyboard is released; and in Step 170, the user judges whether it is required to further input a character through the virtual keyboard on the multi-point touch screen; if yes, Step 110 is performed; otherwise, the operation is ended.

9. The multi-contact character input method as in claim 2, wherein, the method comprises a process of presetting a specific character, which comprises the following steps:

in Step 410, a user interface for presetting is entered;

in Step 420, the user clicks any position on the virtual keyboard of the touch screen through two fingers at the same time to implement input of a specific character, and designates the specific character as space, backspace or line feed through presetting;

in Step 430, a character corresponding to any position clicked through two fingers at the same time on the virtual keyboard is selected;

in Step 440, the performed setting is saved, and the operation is ended;

the method comprises a process of implementing input of a specific character, which comprises the following steps:

in Step 510, a virtual keyboard is displayed on a multi-point touch screen and key-press inputting is performed;

in Step 520, the user judges whether it is required to input a designated character; if yes, Step 530 is performed; otherwise, Step 550 is performed;

in Step 530, any position on the virtual keyboard is clicked through two fingers at the same time to implement the input of the designated character;

in Step 540, the user judges whether it is required to further input the designated character; if yes, Step 530 is performed; otherwise, Step 550 is performed; and in Step 550, the user judges whether it is required to further input a character through the virtual keyboard on the multi-point touch screen; if yes, Step 510 is performed; otherwise, the operation is ended.

10. The multi-contact character input method as in claim 2, wherein, the method comprises a process of presetting a designated character, which comprises the following steps:

in Step 710, a user interface for presetting is entered;

in Step 720, a manner is selected, in which a specific position on the virtual keyboard of the touch screen is clicked through two fingers at the same time to implement the input of a specific character;

in Step 730, the virtual keyboard is divided into a left half portion and a right half portion;

in Step 740, it is chosen that a keyboard area is divided into left and right portions;

in Step 750, a character is selected, which corresponds to that the left area of the keyboard is clicked through two fingers at the same time;

in Step 760, a character is selected, which corresponds to that the right area of the keyboard is clicked through two fingers at the same time; and in Step 770, the performed setting is saved and the operation is ended;

the method comprises a process of implementing input of a designated character, which comprises the following steps:

in Step 810, a virtual keyboard is displayed on a multi-point touch screen and key-press inputting is performed;

in Step 820, the user judges whether it is required to input a designated character; if yes, Step 830 is performed; otherwise, Step 880 is performed;

in Step 830, the virtual keyboard is clicked through two fingers at the same time, and positions x1 and x2 clicked by the two fingers in x direction are recorded;

in Step 840, the system judges whether the user clicks the left part or the right part of the virtual keyboard through two fingers at the same time; if the user clicks the left part, Step 850 is performed, and if the user clicks the right part, Step 860 is performed;

wherein, the judging is performed through the following method: it is assumed that a position of a central line for dividing a left part and a right part on the virtual keyboard of the multi-point touch screen is x0, a value val=(x1−x0)+(x2−x0) is calculated, and if val<=0, it indicates that the user clicks the left part of the virtual keyboard through two fingers at the same time; otherwise, it indicates that the user clicks the right part of the virtual keyboard through two fingers at the same time;

in Step 850, a character corresponding to the left part of the virtual keyboard is input, which is a backspace functional key, and Step 870 is performed;

in Step 860, a character corresponding to the right part of the virtual keyboard is input, which is a space key, and Step 870 is performed;

in Step 870, the user judges whether it is required to further input a designated character; if yes, Step 830 is performed; otherwise, Step 880 is performed; and in Step 880, the user judges whether it is required to further input a character through the virtual keyboard on the multi-point touch screen; if yes, Step 810 is performed; otherwise, the operation is ended.

11. The multi-contact character input method as in claim 2, wherein the method comprises a process of presetting a designated character, which comprises the following steps:

in Step 1101, a user interface for presetting is entered;

in Step 1102, a manner is selected, in which a specific position on the virtual keyboard on the touch screen is clicked through two fingers at the same time to implement the input of a specific character;

in Step 1103, a manner is selected, in which the area of the virtual keyboard on the touch screen is not rigidly divided;

in Step 1104, a specific character required to be designated is selected;

in Step 1105, the area of the virtual keyboard is displayed;

in Step 1106, the user clicks the virtual keyboard on the touch screen through two fingers at the same time, and positions clicked through the two fingers at this time are recorded as standard input positions of the specific character;

in Step 1107, the user judges whether it is required to further designate a specific character, if yes, Step 1104 is performed; otherwise, Step 1108 is performed; and in Step 1108, the performed setting is saved and the operation is ended;

the method comprises a process of implementing input of a specific character, which comprises the following steps:

in Step 1201, a virtual keyboard is displayed on a multi-point touch screen and key-press inputting is performed;

in Step 1202, the user judges whether it is required to input a designated character; if yes, Step 830 is performed; otherwise, Step 880 is performed;

in Step 1203, the user clicks the virtual keyboard through two fingers at the same time, and positions (x1, y1) and (x2, y2) clicked through the two fingers are recorded; and in Step 1204, the system calculates a character the user wants to input according to the positions clicked by the user through the two fingers on the virtual keyboard and the standard positions of the specific character stored in the presetting step;

wherein, the calculation is performed through the following method: n specific characters are stored in the presetting step, and the standard clicked positions corresponding to an $i^{th}$ specific character are (x1i, y1i) and (x2i, y2i), a value of a position parameter VALi (i=1, 2, 3, ..., n) of the n groups of points is calculated, VALi= (x1−x1i)*(x1−x1i)+(y1−y1i)*(y1−y1i)+(x2−x2i)*(x2−x2i)+(y2−y2i)*(y2−y2i), and a specific character corresponding to the smallest value VALi is selected as a character the user wants to input;

in Step 1205, the character obtained through calculation which the user wants to input is input;

in Step 1206, the user judges whether it is required to further input the designated character; if yes, Step 1203 is performed; otherwise, Step 1207 is performed; and in Step 1207, the user judges whether it is required to further input a character through the virtual keyboard on the multi-point touch screen; if yes, Step 1201 is performed; otherwise, the operation is ended.

12. A multi-contact character input system, comprising:

a multi-contact operation setting module, used for setting an input character corresponding to each multi-contact operation, wherein attributes of the multi-contact operation comprise a position of each contact in a plurality of contacts, or/and the number of contacts contacting a multi-point touch screen within the same time, or/and a sliding direction of each contact;

a database, used for recording a character or/and an operation command corresponding to each multi-contact operation;

an operation identifying module, used for identifying the multi-contact operation of a user; and an operation parsing module, used for obtaining a corresponding input character from the database according to the attributes of the multi-contact operation.

\* \* \* \* \*